United States Patent [19]
Clowez

[11] Patent Number: 6,061,429
[45] Date of Patent: May 9, 2000

[54] TEST TELEPHONE

[75] Inventor: Eric Clowez, Bois Colombes, France

[73] Assignee: S.A. Henri Depaepe, Colombes, France

[21] Appl. No.: 08/948,025

[22] Filed: Oct. 9, 1997

[30] Foreign Application Priority Data

Oct. 14, 1996 [FR] France .................................. 96 12596

[51] Int. Cl.⁷ ............................. H04M 1/24; H04M 3/08; H04M 3/22

[52] U.S. Cl. ................................. 379/30; 379/21; 379/27; 379/337

[58] Field of Search ................................. 379/21, 27–29, 379/30–31, 93.09, 93.11, 372–375, 377, 380, 386, 1–2, 6, 8, 22, 24, 7, 35, 381, 337

[56] References Cited

U.S. PATENT DOCUMENTS

| | | |
|---|---|---|
| 3,708,634 | 1/1973 | Vantill et al. ............................... 379/21 |
| 4,807,278 | 2/1989 | Ross . |
| 4,939,765 | 7/1990 | Benjamin et al. ......................... 379/29 |
| 5,025,466 | 6/1991 | Hilligoss et al. .......................... 379/21 |
| 5,140,631 | 8/1992 | Stahl . |
| 5,142,569 | 8/1992 | Peters et al. ............................. 379/373 |
| 5,193,107 | 3/1993 | Parker et al. .............................. 379/21 |
| 5,544,241 | 8/1996 | Dibner et al. ........................... 379/373 |
| 5,604,785 | 2/1997 | Pryor et al. ............................... 379/29 |
| 5,617,466 | 4/1997 | Walance .................................... 378/21 |
| 5,652,575 | 7/1997 | Pryor et al. ......................... 340/825.77 |
| 5,668,870 | 9/1997 | Dahlquist ................................ 379/374 |
| 5,675,640 | 10/1997 | Tappert et al. .......................... 379/373 |

*Primary Examiner*—Curtis A. Kuntz
*Assistant Examiner*—Duc Nguyen
*Attorney, Agent, or Firm*—Laubscher & Laubscher

[57] ABSTRACT

A test terminal includes a circuit for opening a loop switch to prevent setting up of calls from the terminal via a telephone line when a signal received from the telephone line via a first high-impedance connection exceeds a predetermined threshold indicating that the telephone line is busy. An alarm circuit indicates that any call from the terminal is prohibited. Operation of the terminal in discreet monitoring mode is also prohibited if the line is busy.

11 Claims, 3 Drawing Sheets

TEST TELEPHONE

BACKGROUND OF THE INVENTION

1. Field of the Invention

The present invention relates generally to a test telecommunication terminal used by operators to verify the state of an analog or digital telephone line or a leased telephone line.

2. Description of the Prior Art

At present, when a test terminal of this kind is connected to a telephone line, the terminal operator sets up a call even if another call is already in progress on the line. This disturbs the call in progress and is a major nuisance to users communicating via the telephone line.

In particular, if the call in progress involves analog or digital data terminals, setting up a call from the test terminal seriously disturbs the data exchanged between the data terminals.

OBJECT OF THE INVENTION

The main object of the present invention is to provide a telecommunication terminal guaranteeing the confidentiality of calls in progress on a telephone line and incapable of setting up a call through a busy telephone line.

SUMMARY OF THE INVENTION

Accordingly, a telecommunication terminal comprises a loop switch which, when closed, connects said terminal in talk mode to a telephone line, and opening means for opening said loop switch so as to prevent setting up of calls from said terminal via the telephone line when a signal received from the telephone line via a first high-impedance connection exceeds a predetermined threshold.

To advise the terminal operator that a call is in progress on the line and that seizing the telephone line is prohibited, means controlled by the opening means, is provided to derive an alarm signal if the signal received from said telephone line exceeds the predetermined threshold.

Test telecommunication terminals generally include a second high-impedance connection which connects the telephone line directly to an earpiece of a handset for "discreet monitoring" of calls in progress on the line without disturbing them. For reasons of confidentiality it is also desirable to be able to prohibit connection to the telephone line in discreet monitoring mode. For this purpose, the terminal according to the invention comprises a switch means controlled by the opening means for breaking the second high-impedance connection if the signal received from said telephone line exceeds the predetermined threshold.

In some circumstances, the operator of a test terminal is obliged to set up a call via the telephone line. In order to set up the call quickly when the line is busy, the terminal according to the invention comprises means controlled by the opening means and by a manually operable switch for transmitting a voice message to the telephone line via a low-impedance connection if the signal received from the telephone line exceeds the predetermined threshold and the manually operable switch is being operated. Accordingly, if the line is busy with a telephone call, the voice message transmitted by the terminal in accordance with the invention informs the communicating users that an operator is about to cut into their telephone line. If the telephone line is busy with a data call, the voice message transmitted via the low-impedance connection disturbs the call in progress in such a way that the communicating data terminals cease to communicate.

It is preferable that the terminal automatically facilitates fast call set-up by means for closing the loop switch after transmission of the voice message whereby the terminal seizes the telephone line.

Typically, the opening means comprises a comparator for comparing the signal received from the telephone line to the predetermined threshold. The comparator receives the signal received from said telephone line via an amplifier connected to said first high-impedance connection, a high-pass filter and a rectifier.

The terminal according to the invention can further include a module connected in series with a ringer circuit for imparting a high impedance to the ringer circuit responsive to a data call on the telephone line. According to a first embodiment, the module comprises two oppositely poled Zener diodes connected in series with the ringer circuit across two wires of the telephone line. According to a second embodiment, the module includes a diode bridge means connected in series with the ringer circuit across the telephone line wires. The diode bridge means includes four rectifier diode branches and a diagonal branch. A first pair of lateral branches includes a first pair of oppositely poled diodes connected in series across said line telephone wires, and a second pair of lateral branches includes a pair of oppositely poled diodes connected in series across said line telephone wires. The diagonal branch includes a Zener diode, a parallel combination of a resistor and a capacitor connected in series with said Zener diode, and two transistors for short-circuiting the Zener diode when it is turned on. The first transistor has first and second electrodes respectively connected across said parallel combination. The second transistor has first and second electrodes respectively connected across the Zener diode. Third electrodes of the first and second transistors are connected together to the anode of the Zener diode through a resistor.

BRIEF DESCRIPTION OF THE DRAWINGS

Further features and advantages of the invention will be apparent from the following particular description of several preferred embodiments of the invention as illustrated in the corresponding accompanying drawings in which.

DESCRIPTION OF THE PREFERRED EMBODIMENTS

Figure 1:
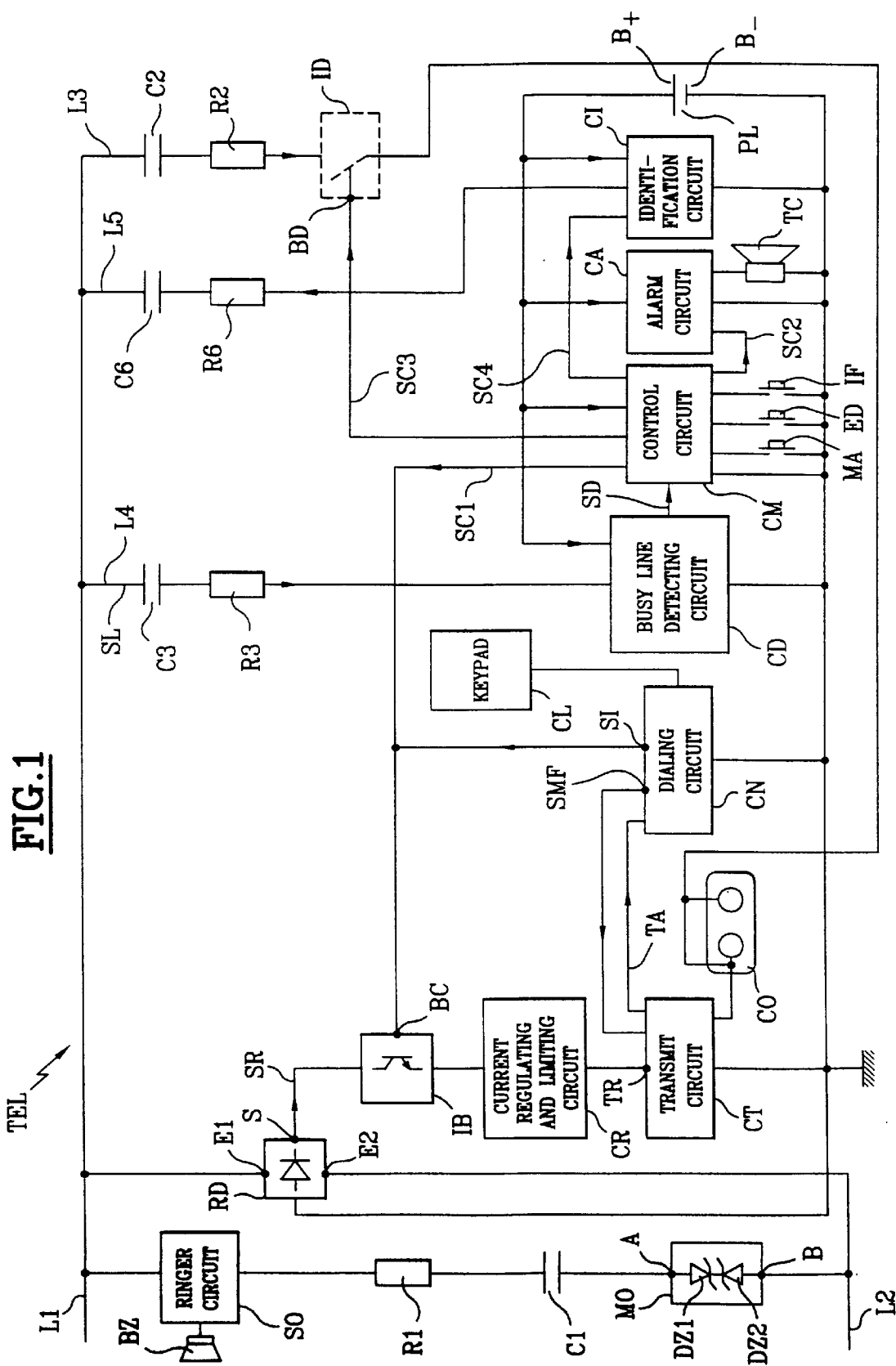
FIG. 1 is a block diagram of the test terminal in a complete implementation of the invention.

Referring to FIG. 1 a telecommunication terminal such as a test telephone TEL, to which reference will be made hereinafter, or a facsimile machine, a videotex terminal or a personal computer fitted with a telephone card, is connected to two telephone line wires L1 and L2. The telephone TEL includes in a known manner a ringer circuit SO, a full-wave voltage rectifier RD of the Graetz bridge type, a transistorized line loop switch IB, a transmit circuit CT and a dialing circuit CN.

The ringer circuit SO is associated with a buzzer BZ and is connected between the telephone line wires L1 and L2 in series with a resistor R1 and a capacitor C1 so that only the dynamic ringing current transmitted by the line L1-L2 passes through the circuit SO.

The first line wire L1 is connected to a first input terminal E1 of the rectifier RD. A second input terminal E2 of the rectifier RD is connected to the second line wire L2. A rectified signal SR at an output terminal S of the rectifier RD is applied via the loop switch IB to a transmit-receive input TR of the transmit circuit CT. A control terminal BC of the loop switch IB is connected to an output SI of the dialing circuit CN which produces pulses for decimal dialing in response to operation of keys of a keypad CL connected to the circuit CN. As an alternative to this, when the state of a switch included in the dialing circuit CN is modified, an output SMF of the dialing circuit CN transmits coded signals corresponding to dialed digits entered at the keypad CL which a multifrequency generator in the transmit circuit converts into DTMF coded signals.

A current regulating and limiting circuit CR is connected between the loop switch IB and the transmit-receive input TR of the transmit circuit CT and limits the current applied to the transmit circuit CT to a value which is typically equal to 60 mA.

The transmit circuit CT is connected to a telephone handset CO, handles the conventional impedance matching and acoustic coupling or singing functions and includes a differential 2-wire-to-4-wire transformer for isolating a receiving channel on which audio frequency signals are received by the earpiece of the handset CO and a transmitting channel on which audio frequency signals are transmitted by the microphone of the handset. The transmit circuit CT takes a remote power feed voltage TA from the telephone line L1-L2 via the rectifier RD and feeds it to the dialing circuit CN.

An amplified listening circuit (not shown) is optionally connected to the transmit circuit and includes a pushbutton for selecting one of two loudspeaker monitoring amplification gain levels.

A high-impedance line connection L3 including a capacitor C2 and a resistor R2 in series and connecting the line wire L1 directly to the earpiece of the handset CO is also provided. When closed, this connection allows "discreet monitoring" and corresponds to a mode of operation of the telephone called as "monitor mode" for monitoring the telephone line L1-L2, i.e. the signals carried on the telephone line are monitored without disturbing them. The telephone TEL can therefore be connected to the telephone line L1-L2 either in "talk mode", if the loop switch IB is closed to connect the transmit circuit CT to the telephone line L1-L2 throughout a call, except for any pulse dialing pulses, or in "discreet monitor mode", as indicated hereinabove. If the telephone TEL includes the amplified monitoring circuit, the latter can be activated only in talk mode.

In a first embodiment of the invention the test telephone TEL further includes a control circuit CM, a busy line detecting circuit CD and an alarm circuit CA. These circuits are all powered in parallel from a battery PL which relays the remote power feed current on the telephone line L1-L2 as the operation of these circuits must not disturb the signals on the telephone line.

The control circuit CM controlling the switching on and off of the telephone TEL is responsive on the one hand to the position of an ON/OFF switch MA connected between the control circuit CM and a grounding terminal B_ of the battery PL and operable by an operator, and on the other hand to a control signal SD supplied by the busy line detecting circuit CD and informing the control circuit CM whether the telephone line L1-L2 is busy or not. If the control signal SD is at low logic state "0", which corresponds to the circuit CD detecting that the telephone line L1-L2 is not busy, when the ON/OFF switch MA is closed by the operator, i.e. placed in the ON position in order to set up a call, the control circuit CM sets to high logic state "1" a signal SC1 applied to control terminal BC of the loop switch IB in order to close the latter and set the telephone TEL to talk mode. If the signal SD is at "1" when the switch MA is closed, the circuit CD detects that the telephone line L1-L2 is busy and the control circuit CM holds the loop switch IB open by setting the signal SC1 to "0" to prevent the telephone TEL seizing the telephone line. The ON/OFF switch MA when open and placed in the OFF position maintains the signal SC1 at "0".

The control circuit CM is either made up of discrete logic components or based on a microprocessor.

The busy line detecting circuit CD is connected to the line wire L1 by a high-impedance loop connection L4 including a capacitor C3 and a resistor R3 in series. Because of the high-impedance connection L4, the circuit CD detects signals of a call in progress on the telephone line L1-L2 without disturbing the call.

Figure 2:
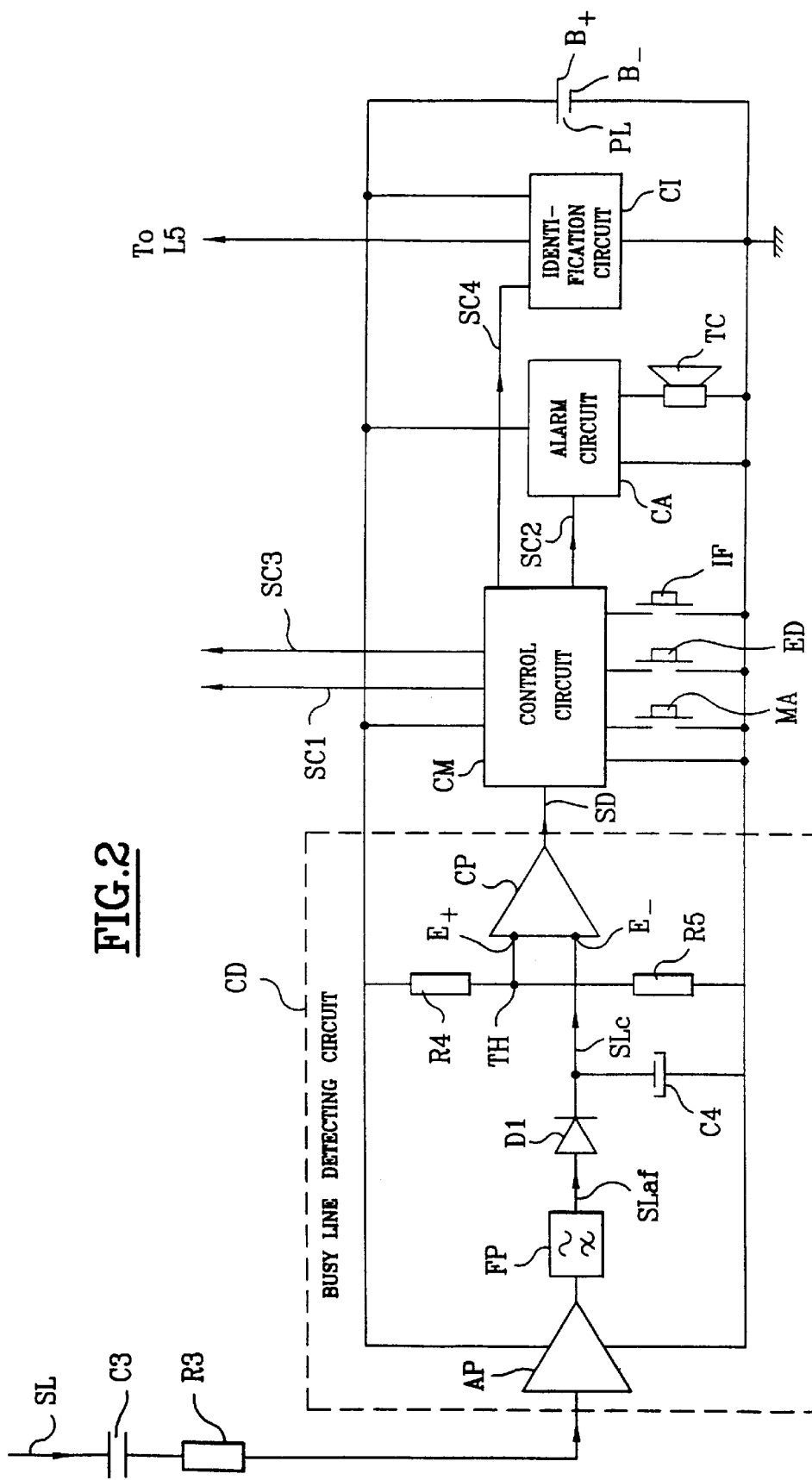
FIG. 2 is a schematic showing in more detail a busy line detector circuit included in the terminal from FIG. 1.

Referring to FIG. 2, the busy line detecting circuit CD includes, in series starting from the resistor R3, a high-impedance amplifier AP, a high-pass filter FP, a rectifier-filter including a diode D1 and a capacitor C4, and a voltage comparator CP. A line signal SL from the line wire L1 is transmitted to one input of the amplifier AP via the high-impedance connection L4. The line signal SL is amplified by the amplifier AP and then filtered by the high-pass filter FP in order to eliminate low-frequency interference signals, the frequencies of which are typically below 50 Hz. High-pass filter FP applies an amplified and filtered line signal SLaf to the anode of the diode D1. The cathode of diode D1 is connected to a first input E_ of the comparator CP and, via the capacitor C4, to the grounding terminal B_ of the battery PL. The rectifier-filter D1-C4 transforms the alternating current signal SLaf into a direct current signal SLc that is applied to the first input E_ of the comparator CP. A second input E_+ of the comparator CP is connected to a common terminal of resistors R4 and R5 of a voltage divider connected between a positive terminal B_+ of the battery PL and the grounding terminal B_. The resistances of the resistors R4 and R5 impose a predetermined voltage threshold TH of a few volts at the input E_+. The comparator CP compares the signal SLc to the threshold TH and supplies a control signal SD to the control circuit CM which is at "0" if the signal SLc from the telephone line is less than the predetermined threshold TH and at "1" if the signal SLc is more than the threshold TH.

Under the control of the control circuit CM, the alarm circuit CA generates an alarm signal that is transmitted to an acoustic transducer TC also powered from the battery PL. The alarm signal informs the operator of the telephone TEL that the telephone line L1-L2 is busy and that operation of the telephone TEL in talk mode is prohibited. To this end, the circuit CA is activated by a control signal SC2 at "1" derived by the control circuit CM when the signal SD delivered by the detecting circuit CD is at "1" and the ON/OFF switch MA is closed. A time-delay initiated in the control circuit CM by the change from the OFF position to the ON position of the switch MA maintains the signal SC2 at "1" and therefore maintains the activation of the circuit CA for a predetermined time so that the alarm signal can be perceived correctly by the operator. The alarm signal can be a particular tone or a synthesized voice message. In an alternative, the circuit CA activates a light-emitting diode in parallel with or replacing the transducer TC for as long as SC2="1". The light-emitting diode can be replaced by a conventional liquid crystal display screen on which a written message is displayed.

In a second embodiment of this invention, a MOS transistor or relay type switch ID (FIG. 1) is inserted into the high-impedance connection L3 for discreet monitoring.

The control circuit CM commands the switch ID in accordance with, on the one hand, the position of a discreet monitoring switch ED connected between the circuit CM and the grounding terminal B_ and operable by the operator and, on the other hand, the control signal SD supplied to the circuit CM by the detecting circuit CD. If the control signal SD is at "0" (line not busy) when the operator closes the switch ED to begin discreet monitoring of signals on the telephone line L1-L2, the control circuit CM applies a signal SC3 at "1" to a control terminal BD of the switch ID in order to turn on the switch ID and authorize discreet monitoring. If the control signal SD is at "1", indicating that the telephone line L1-L2 is busy, when the switch ED is closed, the signal SC3 is kept at "0" by the circuit CM, which keeps the switch ID open and maintains the interruption of the high-impedance discreet monitoring connection L3 between the line wire L1 and the handset CO. In this way discreet monitoring is prevented if a call is in progress on the telephone line.

Opening the discreet monitoring switch ED causes the signal SC3 to go to "0".

In a third embodiment of this invention, the test telephone TEL further includes, compared to the first or second embodiment, an identification circuit CI connected to the line wire L1 via a low-impedance connection L5 including a resistor R6 and a capacitor C6 in series. The circuit CI, the function of which will be explained below, is powered by the battery PL as shown in FIG. 1.

A forcing or override switch IF operable by the operator is connected between the control circuit CM and the grounding terminal B_. The forcing switch IF is closed by the operator to use the telephone TEL in talk mode even though the alarm signal emitted by the transducer TC shows the telephone line L1-L2 is busy. The identification circuit CI is activated by setting a control signal SC4 produced by the control circuit CM to "1", the signal SC4 being at "1" only when the forcing switch IF is operated and the signal SD is at "1".

The function of the circuit CI is to generate a synthesized voice message to be transmitted to the telephone line L1-L2 via the low-impedance connection L5 so that the voice message can be perceived by users communicating via the telephone line L1-L2. The voice message is repeated two or three times, for example. If the user terminals communicating are telephones, the voice message informs the users that the test telephone TEL is about to be connected to the telephone line for tests. To this end the circuit CI includes a voice interface that produces the voice message from data recorded in a memory of the circuit CI. If the user terminals communicating on the line L1-L2 are data terminals, the insertion of the voice message transmitted by the aforementioned voice interface onto the line strongly disturbs the data so that the data terminals, recognizing a fault on the line, cease to communicate.

After operating the switch IF, when the signal SD is at "1", apart from setting the signal SC4 applied to the identification circuit CI to "1" to transmit the voice message, the control circuit CM sets the control signal SC2 to "0" in order to deactivate the alarm circuit CA and sets the control signal SC1 to "1" to authorize operation of the telephone TEL in talk mode. The telephone TEL then sets up a call via the telephone line L1-L2. The signal SC1 is set to "1" at the end of a predetermined time-delay following on from the voice message so that the users of the terminals communicating at the time the forcing switch IF is closed have time to break off the call in the case of data terminals before the telephone TEL seizes the telephone line to set up a call.

In accordance with the invention, a module MO is provided to impart a high impedance to the ringer circuit SO in order to prevent any unwanted activation of the ringer circuit SO, in particular if the telephone line L1-L2 is carrying a digital or analog data signal call.

FIG. 1 shows a first embodiment of the module MO. In this embodiment the module MO comprises two oppositely poled Zener diodes DZ1 and DZ2 connected in series with the circuit SO, the resistor R1 and the capacitor C1 between the line wires L1 and L2. If the voltage at the terminals of the module MO is less than the sum of the knee voltage of one of the Zener diodes DZ1 and DZ2, which is reverse biased, and the forward conduction voltage of the other Zener diodes DZ2, DZ1, which is forward biased, the module MO is in a blocking state and the ringer circuit SO is not powered. The ringer circuit SO is powered only when the voltage at the terminals of the module MO is greater than the sum of the aforementioned two voltages, regardless of the relative polarities of the line wires L1 and L2.

Figure 3:
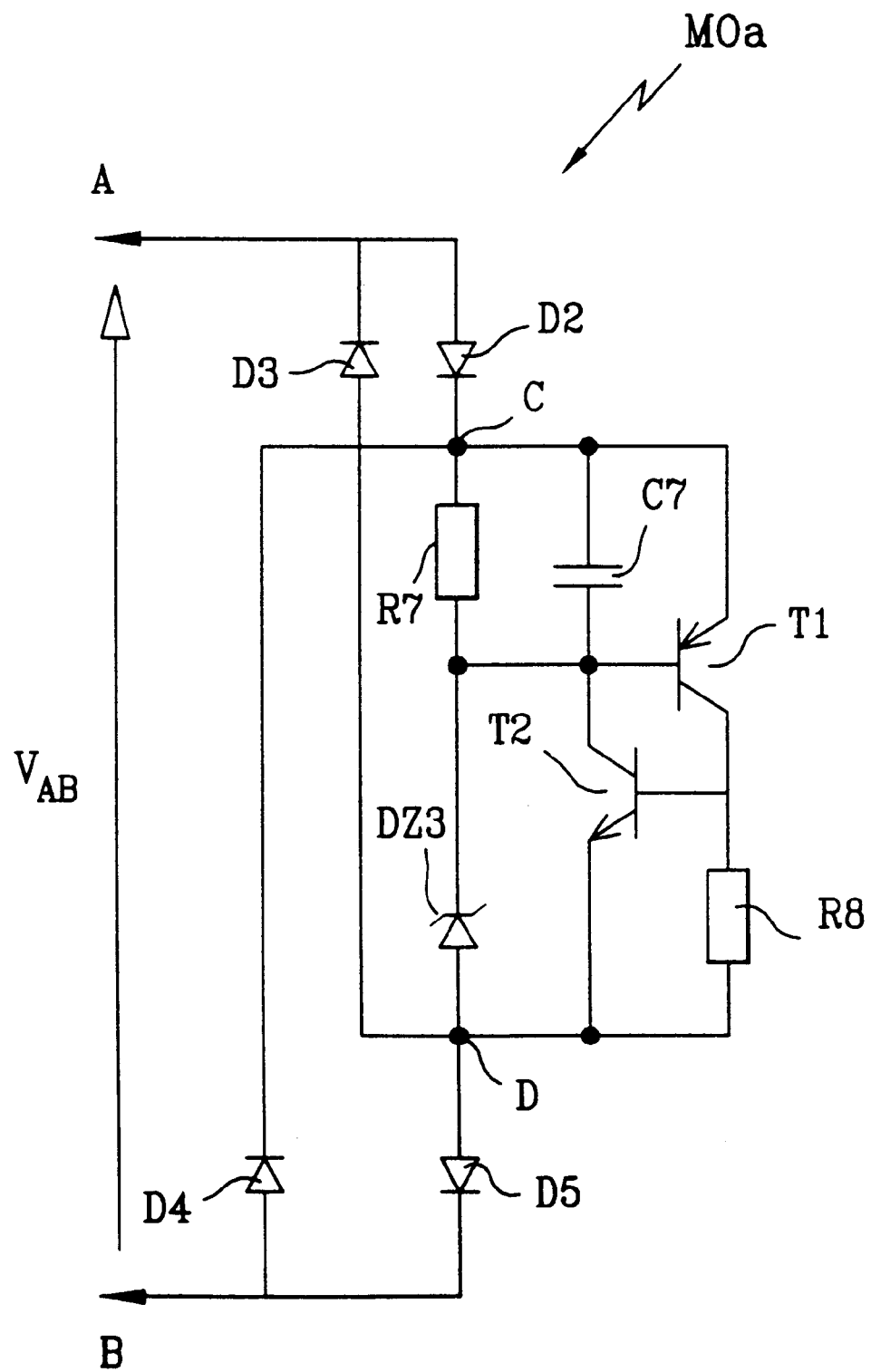
FIG. 3 is a schematic of a module of the present invention for conferring a high impedance on the ringer circuit included in the terminal on FIG. 1.

Referring to FIG. 3, the module MOa in a second embodiment includes a bridge with four lateral branches A-C, A-D, C-B and D-B including respective rectifier diodes D2 through D5 and a diagonal branch C-D. A first pair of lateral branches A-C and C-B includes a pair of oppositely poled rectifier diodes D2 and D4 connected in series across terminals A and B of the bridge. A second pair of lateral branches A-D and D-B includes a pair of oppositely poled rectifier diodes D3 and D5 connected in series across terminals A and B of the bridge. The diagonal branch C-D includes a Zener diode DZ3, and a parallel combination of a resistor R7 and a capacitor C7 connected in series with the Zener diode DZ3. The terminal C is common to one terminal of the resistor R7 and of the capacitor C7 and to the cathodes of the diodes D2 and D4, the anodes of which are respectively connected to the capacitor C1 and to the line wire L2. The terminal D is common to the anode of the Zener diode DZ3 and to the anodes of the diodes D3 and D5 the cathodes of which are respectively connected to the capacitor C1 and to the line wire L2.

The module MOa also includes a PNP bipolar transistor T1 and an NPN bipolar transistor T2. The emitter of the first transistor T1 is connected to the terminal C and to a terminal common to the resistor R7 and the capacitor C7. The base of transistor T1 is connected to the cathode of the Zener diode DZ3. The collector and the emitter of the second transistor T2 are respectively connected to the cathodes and the anode of the Zener diode DZ3. The collector of the transistor T1 and the base of the transistor T2 are connected together to the terminal D by a resistor R8.

When the voltage $V_{AB}$ between the terminals A and B of the module MOa is less than $(2V_d + V_{EB} + V_{DZ3})$, where $V_d$ is the voltage drop of one of the diodes D2 through D5, $V_{EB}$ is the emitter-base voltage of the bipolar transistor T1, and $V_{DZ3}$ is the knee voltage of the Zener diode DZ3 when it is reverse biased, the transistors T1 and T2 and the Zener diode DZ3 are not conducting. The ringer circuit SO is not powered.

When the voltage $V_{AB}$ is more than the voltage $(2V_d + V_{EB} + V_{DZ3})$, a current flows through the base of the transistor T1 and the Zener diode DZ3 which turns on the transistor T1 and applies a voltage to the base of the transistor T2. The capacitor C7 decouples the base resistor R7 of the transistor T1 in the presence of high-frequency interference signals. The transistor T2 is also turned on and short-circuits the Zener diode DZ3. The module MOa has the advantage over the first embodiment shown in FIG. 1 of causing only a small voltage drop at the terminals of the module MOa when the latter is conducting because of the inhibition of the Zener voltage of the diode DZ3 by virtue of the fact that the transistor T2 is turned on.

What is claimed is:

1. A telecommunication terminal, comprising a loop switch which, when closed, connects said terminal in talk mode to a telephone line; opening means for opening said loop switch so as to prevent setting up of calls from said terminal via said telephone line when a signal received from said telephone line via a first high-impedance connection exceeds a predetermined threshold; a hand set with an earpiece; and a second high-impedance connection with switch means connecting said telephone line to said earpiece of said handset, said switch means breaking said second high-impedance connection under the control of said opening means if said signal received from said telephone line exceeds said predetermined threshold.

2. A telecommunication terminal, comprising a loop switch which, when closed, connects said terminal in talk mode to a telephone line; opening means for opening said loop switch so as to prevent setting up of calls from said terminal via said telephone line when a signal received from said telephone line via a first high-impedance connection exceeds a predetermined threshold; and means controlled by said opening means and by a manually operable switch for transmitting a voice message to said telephone line via a low-impedance connection if said signal received from said telephone line exceeds said predetermined threshold and said manually operable switch is being operated.

3. A terminal as claimed in claim 2 further comprising closing means for closing said loop switch after transmission of said voice message in order for said terminal to seize said telephone line.

4. A telecommunication terminal, comprising a loop switch which, when closed, connects said terminal in talk mode to a telephone line; opening means for opening said loop switch so as to prevent setting up of calls from said terminal via said telephone line when a signal received from said telephone line via a first high-impedance connection exceeds a predetermined threshold; a ringer circuit and a bridge means connected in series across two wires of said telephone line, said bridge means having four rectifier diode branches and a diagonal branch which includes a Zener diode; and means for short-circuiting said Zener diode when said Zener diode is turned on.

5. A telecommunication terminal, comprising a loop switch which, when closed, connects said terminal in talk mode to a telephone line; opening means for opening said loop switch so as to prevent setting up of calls from said terminal via said telephone line when a signal received from said telephone line via a first high-impedance connection exceeds a predetermined threshold; a ringer circuit and a diode bridge means connected in series across two wires of said telephone lines, said diode bridge means including a first pair of lateral branches including a first pair of oppositely poled diodes connected in series across said line telephone wires, a second pair of lateral branches including a pair of oppositely poled diodes connected in series across said line telephone wires, and a diagonal branch including a Zener diode, a parallel combination of a resistor and a capacitor connected in series with said Zener diode, a first transistor having first and second electrodes respectively connected across said parallel combination, and a second transistor having first and second electrodes respectively connected across said Zener diode, said first transistor and second transistor having third electrodes connected therebetween.

6. A telecommunication terminal comprising a handset with an earpiece, first and second high-impedance connections connected to one of wires of a telephone line, a loop switch which, when closed, connects said terminal in talk mode to said telephone line, busy line detecting means for detecting a line signal received from said telephone line via said first high-impedance connection thereby opening said loop switch and preventing setting up of calls from said terminal via said telephone line if said line signal exceeds a predetermined threshold.

means controlled by said busy line detecting means for deriving an alarm signal if said line signal exceeds said predetermined threshold, and switch means controlled by said busy line detecting means and connected between second high-impedance connection and said earpiece of said handset for disconnecting said second high-impedance connection from said earpiece if said line signal exceeds said predetermined threshold.

7. A terminal as claimed in claim 6 further comprising a manually operable switch, and means controlled by said busy line detecting means and by said manually operable switch for transmitting a voice message to said telephone line via said low-impedance connection if said line signal exceeds said predetermined threshold and said manually operable switch is being operated.

8. A telecommunication terminal for testing the state of operation of a telephone line, comprising:

(a) means including a normally closed loop switch (IB) for setting up test calls from a terminal via the telephone line; and (b) busy line detecting means (CD) for opening said loop switch to prevent the setting up of calls when the telephone line is busy, said opening means including:
   (1) threshold means (R4, R5) for establishing a predetermined threshold voltage;
   (2) first high-impedance means (L4) connected with the telephone line for supplying a line signal (SL); and
   (3) comparator means (CP) for comparing the amplitude of said line signal (SL) from the telephone line with said threshold voltage.

9. The terminal as claimed in claim 8, wherein said comparator means receives said line signal received from said telephone line via an amplifier connected to said first high-impedance connection, a high-pass filter and a rectifier.

10. A terminal as claimed in claim 8, and further comprising a series combination connected between two wires of said telephone line and including a ringer circuit and a module for imparting a high impedance to said ringer circuit responsive to a data signal call in said telephone line.

11. The terminal claimed in claim 8, and further comprising a ringer circuit, and two oppositely poled Zenger diodes in series connected with said ringer circuit across two wires of said telephone line.

* * * * *